Aug. 23, 1927.
J. F. O'CONNOR
1,640,214
FRICTION SHOCK ABSORBING MECHANISM
Filed Nov. 27, 1925
2 Sheets-Sheet 2
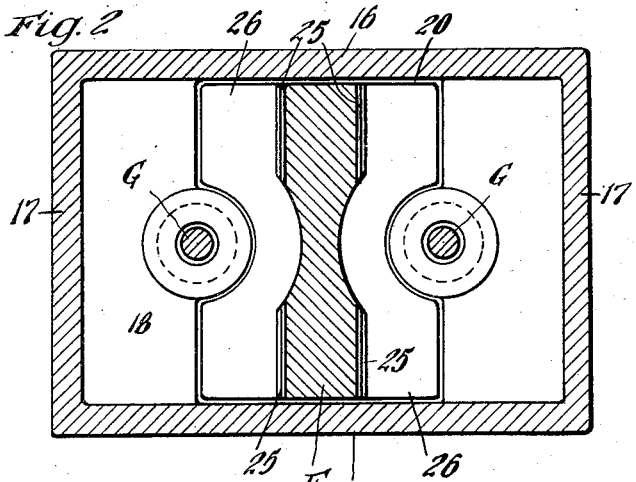
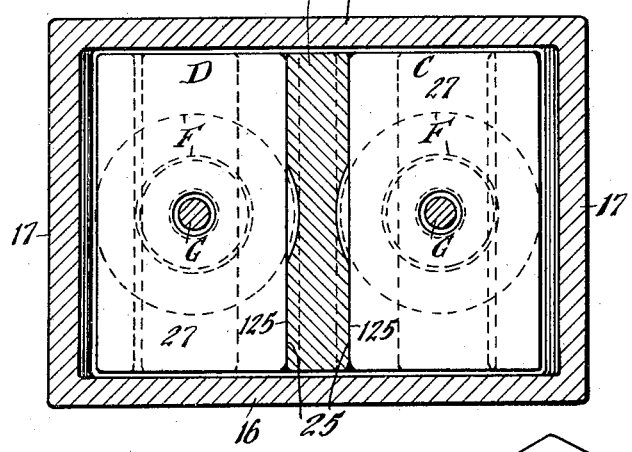
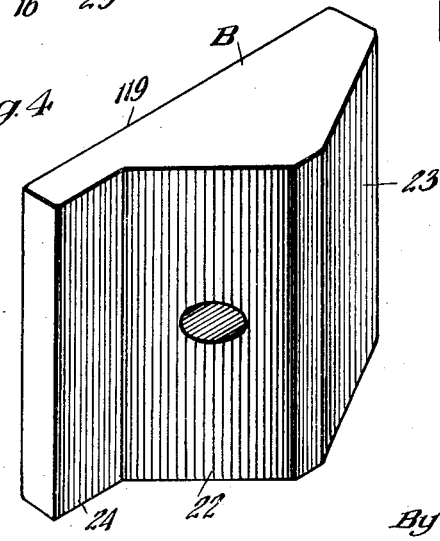
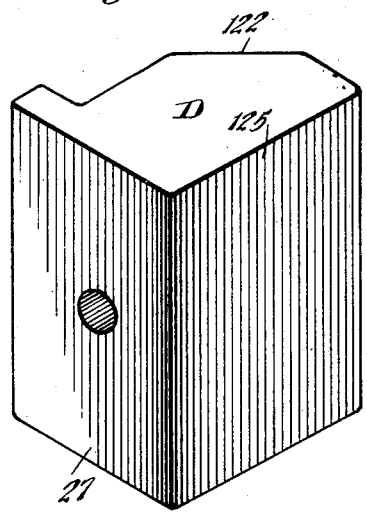
Witness
Wm. Geiger
Inventor
John F. O'Connor
By George I. Haight
His Atty.

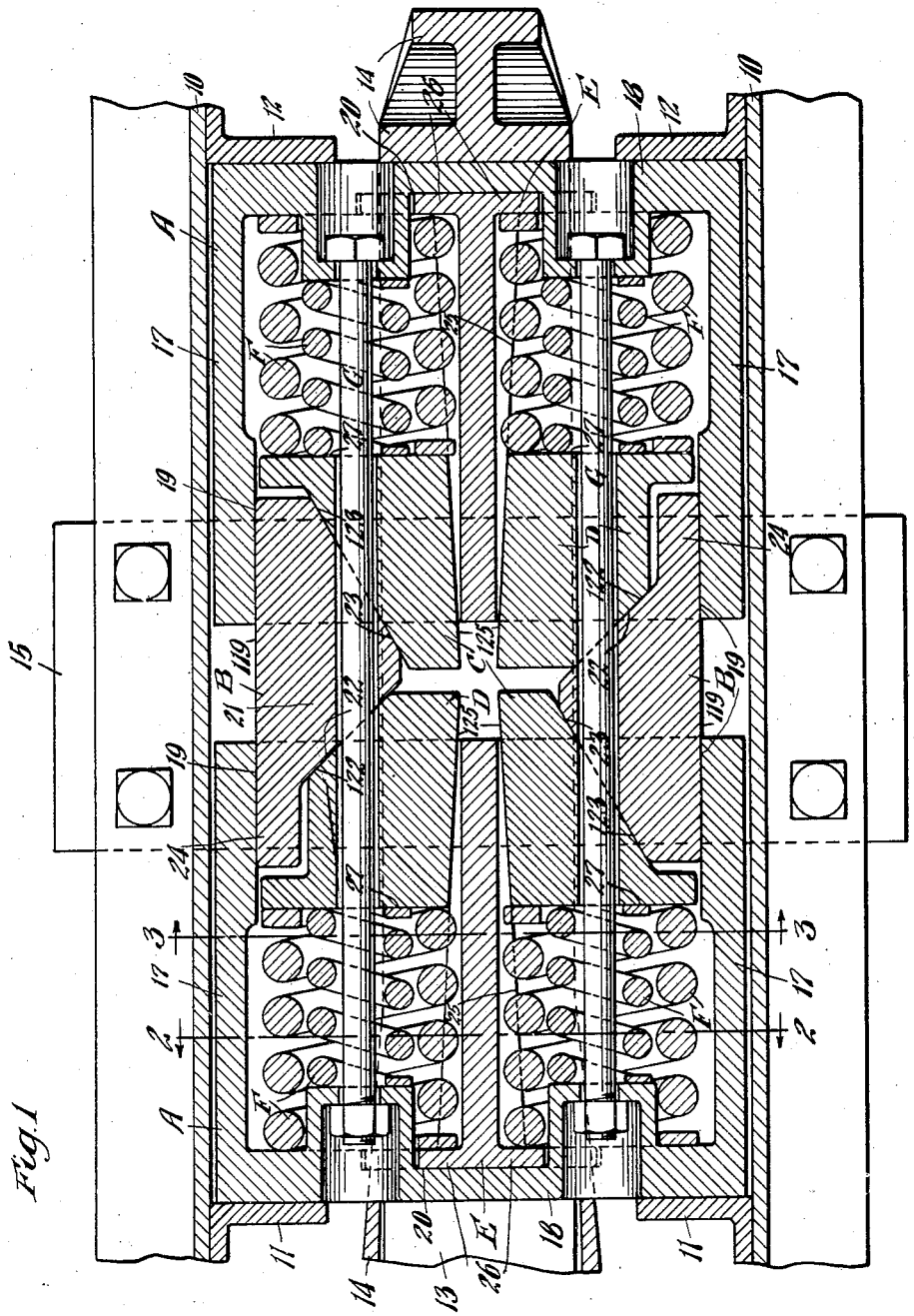

Patented Aug. 23, 1927.

1,640,214

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed November 27, 1925. Serial No. 71,794.

This invention relates to improvements in friction shock absorbing mechanism.

One object of the invention is to provide a friction shock absorbing mechanism especially adapted for railway draft riggings, having high capacity due to relatively large frictional areas together with assured release, employing a plurality of relatively movable friction elements including front and rear relatively movable follower members having friction posts movable therewith and a plurality of friction shoes and wedge elements cooperating therewith, wherein the friction wedge elements and posts have cooperative friction surfaces inclined to the direction of the applied force to produce differential action during compression of the mechanism.

Another object of the invention is to provide a mechanism of the character indicated, employing a friction wedge system including a plurality of friction elements and cooperating friction posts, wherein the friction elements have cooperating wedge faces, certain of which are disposed at a relatively keen true wedge acting angle with respect to the longitudinal axis of the mechanism; and others are disposed at relatively blunt releasing angles with reference to said axis.

A still further object of the invention is to provide a friction shock absorbing mechanism, of the double ended type, including front and rear friction shells having friction shoes cooperating therewith, front and rear friction posts movable with the shells and wedge means cooperating with the shoes and having frictional engagement with the posts.

Other objects and advantages of the invention will more fully and clearly appear from the description and claims hereinafter following.

In the drawings forming a part of this specification, Figure 1 is a longitudinal, horizontal, sectional view of a portion of a railway draft rigging, showing my improvements in connection therewith. Figures 2 and 3 are transverse, vertical, sectional views corresponding respectively to the lines 2—2 and 3—3 of Figure 1. And Figures 4 and 5 are detailed, perspective views respectively of a wedge friction shoe and a wedge block employed in connection with my improved mechanism.

In said drawings, 10—10 indicate channel-shaped center or draft sills of a railway car underframe, to the inner faces of which are secured front stop lugs 11—11 and rear stop lugs 12—12. The inner end portion of the drawbar is designated by 13 to which is operatively connected a yoke 14 of well-known form. The shock absorbing mechanism proper, hereinafter more fully described, is disposed within the yoke and the yoke in turn is supported in operative position by a detachable saddle plate 15 secured to the draft sills.

The improved shock absorbing mechanism proper, as shown, comprises, broadly, front and rear friction shells A—A; two friction shoes B—B; a pair of wedge blocks C—C; a second pair of wedge blocks D—D; two friction posts E—E; front and rear sets of twin spring resistance elements F—F and F—F; and a pair of retainer bolts G—G.

The front and rear friction shells or casings are of the same design, each being in the form of a substantially rectangular box-like casting having horizontally disposed top and bottom walls 16—16, vertically disposed, longitudinally extending, spaced side walls 17—17; and a transverse end wall 18. The end wall 18 cooperates with the corresponding stop lugs in the manner of the usual follower. The side walls 17 are provided with opposed, interior friction surfaces 19—19 at the inner end thereof. Between the friction surfaces 19 and the end walls 18, the side walls 17 of the shells are cut away, as most clearly indicated in Figure 1. The end wall 18 of each casing A is cut away centrally on the inner side thereof to provide a seat 20 for the inner end of the corresponding friction post E. The friction surfaces 19 of each shell are preferably disposed in parallel relation.

The friction wedge shoes, which are two in number, are disposed at opposite sides of the mechanism. Each shoe has an outer flat friction surface 119 adapted to cooperate with the friction surfaces 19—19 of the front and rear shells A at the same side of the mechanism. On the inner side, each shoe B has a lateral enlargement 21 having a pair of wedge faces 22 and 23 thereon. The wedge face 22 of each shoe is disposed at a relatively blunt releasing angle with reference to the longitudinal axis of the mechanism, while the face 23 is disposed at a relatively keen true wedge acting angle with reference to said axis. The shoes B at the opposite sides of the mechanism are reversely arranged so that the keen wedge face of one shoe and the blunt wedge face of the other shoe are disposed at the same end of the mechanism. Each shoe B is longitudinally elongated, as indicated at 24 at the end thereof carrying the blunt wedge face, so as to cooperate properly with the corresponding friction surface 19 of the friction shell engaged thereby.

The friction posts E which are also of identical design, are two in number, one being associated with each friction shell A. Each post E has a pair of longitudinally disposed, outwardly diverging flat friction surfaces 25—25 on the opposite sides thereof adapted to cooperate with the corresponding wedge blocks. At the outer end, each post is provided with a pair of laterally projecting flanges 26 adapted to be accommodated within the seat 20 of the corresponding casing A. The flanges 26 are of such a thickness that their inner faces lie flush with the inner surface of the corresponding end wall of the shell A. As most clearly shown in Figures 2 and 3, the longitudinal friction surfaces 25 are centrally cut away to accommodate the inner sides of the twin arranged spring resistance elements F associated with the corresponding shell A. Upon reference to Figure 1, it will be seen that the friction posts terminate flush with the inner ends of the top and bottom walls 16 of the shells. The shells A are preferably spaced apart such a distance, in the normal full release position of the mechanism, that the same will abut when the mechanism is fully compressed. Inasmuch as the parts are flush with the inner ends of the friction shells, the posts will also abut when the mechanism is fully compressed, thereby acting as column elements in addition to the top, bottom and side walls of the shells to transmit the actuating force to the draft sills.

The friction wedge blocks which are four in number, comprise two pairs C—C and D—D, the same being arranged in front and rear sets, each comprising one block C and one block D. The blocks C are of identical design, each having a flat transverse end face 27 forming an abutment for the inner end of one of the spring resistance elements F, a flat, longitudinally disposed inner friction surface 125 correspondingly inclined to, and adapted to cooperate with one of the friction surfaces 25 of one of the posts E, and an outer wedge face 123 correspondingly inclined to, and adapted to, cooperate with the keen wedge face 23 of one of the shoes B. Each of the friction wedge blocks D is also provided with a flat end face 27 adapted to cooperate with the inner end of one of the spring resistance elements F and an inner friction surface 125 correspondingly inclined to and adapted to cooperate with one of the friction surfaces of the corresponding post E. Each of the wedge blocks D also has an outer wedge face 122 at the inner end thereof correspondingly inclined to, and adapted to, cooperate with the blunt wedge faces 22 of one of the shoes B.

The spring resistance elements F, which are four in number, comprise front and rear sets of twin arranged springs. Each spring unit of the twin sets comprises an inner relatively light coil and an outer heavier coil. The outer coil of each spring has the opposite ends thereof bearing respectively on the end wall of one of the shells A and the friction wedge blocks associated therewith. The inner coil of each spring has the opposite ends bearing, respectively, on the wedge friction blocks and a hollow boss extending inwardly from the end wall 18 of the post. The outer coils of the spring resistance elements at each end of the mechanism also bear on the flanges 26 of the corresponding post E, thereby maintaining the post in assembled relation with the shell and holding the same seated on the end wall of the shell.

The mechanism is held of overall uniform length and assembled relation by a pair of retainer bolts G—G. As most clearly shown in Figures 1, 2 and 3, the retainer bolts G are disposed in horizontal alinement on opposite sides of the mechanism and have their front and rear ends anchored, respectively, to the hollow boss on the end walls 18 of the front and rear shells. The shanks of the bolts are accommodated within longitudinally extending aligned openings in the wedge blocks C and D and the friction shoes B at the same side of the mechanism. The retainer bolts in addition to holding the parts assembled, also serve to maintain the mechanism under a predetermined initial compression. Compensation for wear of the various friction and wedge faces is had by the expansive action of the spring resistance elements F, which are held under initial compression by the retainer bolts. To permit for the necessary relative movement to compensate for wear of the faces, clearance is left between the ends of the friction shoes and the wedge blocks C and D, as most clearly shown in Figure 1.

The operation of my improved shock absorbing mechanism, assuming a compression stroke, is as follows: The front and rear friction shells A will be moved relatively toward each other, compressing the springs F and forcing the wedge blocks C and D inwardly toward each other longitudinally of the mechanism, thereby setting up a wedging action between the keen angled wedge blocks C and the friction shoes B and forcing the wedge blocks and friction shoes against the posts and friction surfaces of the casings, respectively.

During the continued relative movement of the front and rear friction shells A, the same will be moved relatively to the shoes B, and the friction posts E will be moved inwardly toward each other and relatively to the wedge blocks C and D. It will be evident that friction will thus be had between the posts and friction blocks in addition to the friction produced between the side walls of the friction shells and the friction shoes. Due to the outwardly diverging relation of the friction surfaces of the posts E, the wedge blocks C and D of each set will be forced apart during relative approach of the posts, thereby affecting a differential action. Due to this differential action, the friction wedge system, including the wedge blocks C and D, will be elongated longitudinally of the mechanism, thereby affecting further compression of the spring resistance elements F. The described action will continue either until the actuating force is reduced or the inner ends of the shells come into abutment, whereupon the pressure will be transmitted directly through the shells which act as column load transmitting means. As hereinbefore pointed out, the posts E will also abut when the friction shells come into engagement with each other, thus acting as additional column means to transmit the force to the stop lugs of the draft sills. When the actuating force is reduced, the spring resistance elements F will restore the casings A to normal position and also center the friction wedge system with reference to the posts. Inasmuch as the outer coils of the main spring resistance elements also bear on the flanges of the friction posts, the latter will be carried outwardly with the shells during release. As will be evident, the shells will be slightly expanded during the compression of the mechanism, thereby setting up forces therein tending to contract the same when the actuating pressure is reduced. Due to the relatively blunt cooperating faces on the wedge blocks and the friction shoes, the wedge blocks will be squeezed out from between the shoes during contraction of the shells, thereby relieving the pressure on the cooperating keen wedge faces and greatly facilitating the releasing operation. Although I have herein shown the wedge blocks and friction shoes of my improved mechanism as provided with blunt and keen wedge faces, it will be evident that it is within the scope of my invention to dispose all of the wedge faces at the same angle with reference to the longitudinal axis of the mechanism.

While I have herein shown and described what I now consider the preferred manner of carrying out my invention, the same is merely illustrative and I contemplate all changes and modifications that come within the scope of the claims appended hereto.

I claim:

1. In a friction shock absorbing mechanism, the combination with front and rear follower shells having interior friction surfaces, said shells being relatively movable toward and away from each other; of a tapered friction post movable with each shell; front and rear sets of friction elements cooperating respectively with said posts; spring resistance means interposed between said elements and said shells; and a plurality of friction shoes, each shoe having wedging engagement with one of the friction elements of said front set and one of the friction elements of said rear set, each of said shoes also having frictional engagement with the front and rear follower shells.

2. In a friction shock absorbing mechanism, the combination with front and rear relatively movable follower shells; of a friction post movable with each follower shell; a plurality of friction elements cooperating with each post; a plurality of friction shoes, said shoes and follower shells having cooperating friction surfaces and said shoes and elements having sets of cooperating wedge faces, certain of said sets of faces being disposed at a relatively keen wedge acting angle with respect to the longitudinal axis of the mechanism and the remainder of said cooperating sets being disposed at a relatively blunt releasing angle with respect to said axis; and means for yieldingly resisting relative movement of said follower shells and friction elements.

3. In a friction shock absorbing mechanism, the combination with front and rear, relatively movable shells having longitudinally disposed, interior friction surfaces; of front and rear friction posts relatively movable toward each other upon relative movement of said shells; a plurality of friction elements, certain of said elements having friction surfaces cooperating with friction surfaces of both shells, and having wedging engagement with the remaining elements, said last named elements comprising two sets, each set cooperating with one of the friction posts; and yielding means for resisting movement of said sets of elements with respect to the shells and posts.

4. In a friction shock absorbing mechanism, the combination with front and rear followers having longitudinally disposed friction surfaces, said followers being relatively movable toward and away from each other; of front and rear friction elements movable with said followers; a friction system cooperating with said elements, said system including a pair of friction shoes, and two pairs of friction members having wedging engagement with the shoes, each pair of friction members cooperating with one of said friction elements; and spring means interposed between each follower and the friction system.

5. In a friction shock absorbing mechanism, the combination with front and rear follower shells, each shell having a pair of opposed, longitudinally extending friction surfaces, said shells being movable toward and away from each other; of a pair of friction shoes disposed at opposite sides of the mechanism, each shoe having a friction surface cooperating with the friction surfaces of both shells at the same side of the mechanism, each shoe also having front and rear wedge faces; front and rear friction posts, said posts being movable respectively with said follower shells; a pair of wedge friction members cooperating with each post, said members being disposed at opposite sides of said post, said wedge friction members of each post having wedging engagement with the corresponding ends of said shoes; and spring means for opposing relative movement of said wedge friction members and posts and also opposing relative movement of said follower shells.

In witness that I claim the foregoing I have hereunto subscribed my name this 24th day of November, 1925.

JOHN F. O'CONNOR.